June 11, 1968 H. REICH ETAL 3,387,561
ACTUATOR ARRANGEMENT FOR A FLYING OBJECT
Filed Oct. 14, 1966 2 Sheets-Sheet 1

Inventors:
Heinrich Reich,
Walter Meili
James Gillodey
By Michael S. Striker
Attorney

United States Patent Office 3,387,561
Patented June 11, 1968

3,387,561
ACTUATOR ARRANGEMENT FOR A
FLYING OBJECT
Heinrich Reich, Bickacker, and Walter Meili and James Gilhooley, Zurich, Switzerland, assignors to Contraves AG, Zurich, Switzerland
Filed Oct. 14, 1966, Ser. No. 588,243
Claims priority, application Switzerland, Oct. 15, 1965,
14,258/65
9 Claims. (Cl. 102—83)

ABSTRACT OF THE DISCLOSURE

A rocket has a threaded axial spindle on which an actuator is mounted for axial and rotary movement by means of rollers rolling on the spindle thread so that the actuator moves due to inertia during flight and in a time period depending on the acceleration of the rocket to an end position for actuating a control element which causes ignition of an explosive charge.

---

The present invention relates to an actuator arrangement for a flying object, such as a rocket, and more particularly to an actuator arrangement which causes after movement of the rocket for a predetermined distance, actuation of a switch by which an operation is started in the rocket.

The firing of rockets involves the problem of starting an operation in the rocket after the same has moved a predetermined distance away from the launching pad, irrespective of whether the predetermined distance is reached in a very short time due to excessive acceleration of the rocket, or after a much longer time due to a lesser acceleration of the rocket.

At this predetermined distance, a control element, such as a switch, is to be operated for closing a circuit which effects the necessary operation, for example destruction of the rocket in the event of a malfunction, or the ignition of a warhead carried by the rocket.

It is one object of the invention to provide a reliable actuator arrangement for effecting an operation on a rocket or like flying object at a predetermined point of the flight path of the rocket.

Another object of the invention is to provide an actuator arrangement which effects the actuation of a control element at a predetermined distance from the launching path of the rocket.

Another object of the invention is to provide an actuator arrangement which is responsive to a predetermined acceleration lasting for a predetermined time to actuate a control element on the rocket.

Another object of the invention is to provide an actuator arrangement for a rocket which responds only to a predetermined range of very high accelerations, but does not respond to slow acceleration of the rocket.

With these objects in view, the present invention relates to an actuator arrangement for use with a rocket, or like accelerated flying object, capable of initiating an operation on a rocket after a predetermined flight distance.

One embodiment of the invention comprises a spindle having a screw thread and extending in longitudinal axial direction of the rocket; actuator means having engaging means, such as circumferentially spaced rollers, engaging the thread of the spindle for mounting the actuator means for axial and rotary movement on the spindle; and a control element for initiating a desired operation operated by the actuator means.

The actuator means has an initial position located at the end of the spindle leading in the flight direction and an end position located at the other end of the spindle trailing in the flight direction.

Due to the inertia of the mass of the actuator means, the same moves during the flight of the rocket from an initial position to an end position in axial direction of the spindle while rotating about the same. The movement from the initial position to the end position requires a time depending on the acceleration of the rocket, and at a predetermined acceleration of a predetermined duration, the rocket will have moved a predetermined distance when the actuator means arrives in the end position. The control element by which an operation, such as the ignition of an explosive charge is effected, is operated by the actuating means in the end position. Since the rocket has moved a predetermined distance during the movement of the actuator means from the initial position to the end position, the respective operation is initiated by the control element in the desired flight position of the rocket.

In accordance with the present invention, the actuator means is not operated by continuous accelerations below a selected value of, for example, 3500 cm./sec$^2\approx$3.5 g. Within a comparatively great range of high accelerations, for example in the range from 6000 to 12,000 cm./sec$^2\approx$6 to 12 g., the operation on the rocket is initiated with the required degree of accuracy after the rocket has moved the predetermined desired distance due to the acceleration within the range of accelerations stated above.

The operation of the actuating means by which the flight distance before the start of the operation is determined, should be independent of the surrounding temperature within a range between —40° and +70° C. In order to properly relate the flight distance with the accelerations of the rocket, momentary high accelerations or vibrations should not start the operation of the actuator means.

Apparatus according to the prior art for initiating an operation on a flying rocket cannot obtain the objects of the invention. One known apparatus comprises a mass which is moved by inertia from an initial position to an end position after release by an electromagnet. The movement of the mass is transmitted by a gear transmission to a control element which operates the switch. Due to the great friction in the gear transmission, which is independent of the acceleration of the rocket, the apparatus does not operate with sufficient accuracy.

Another known apparatus comprises a magnetizable ball which is held by a permanent magnet, and which under the action of sufficiently great acceleration forces, moves away from the magnet and displaces a brake fluid through a throttle opening in a cylinder. The operation of this apparatus depends on the temperature of the displaced brake fluid, so that the accuracy of the apparatus is insufficient.

In the preferred embodiment of the invention, sliding friction is entirely eliminated, and the actuator means includes an annular body surrounding the spindle, and a plurality of circumferentially spaced rollers mounted on the annular body and being in rolling contact with the thread of the spindle. The axes of rotation of the rollers are slanted to the axis of a spindle and perpendicular to the helical thread of the spindle so that the rollers are located in an imaginary helical surface having the same helix angle as the thread of the spindle. The rollers have circular ridges having a shape corresponding to the helical groove of the thread so that the rollers roll along the thread while the annular body of the actuator means rotates about the spindle, simultaneously moving in axial direction of the same.

Tests of the actuator arrangement of the present invention have proven that the apparatus obtains the actuation of a control element initiating an operation, with great accuracy, at a predetermined and selected point of the flight path. Nevertheless, the apparatus is of simple construction, and inexpensively manufactured.

In order to prevent that the control element is only momentarily actuated in the end position of the actuator means, a spring biased arresting catch is provided which is engaged by the rotating actuating means just before the same arrives in the end position, resiliently compressed during further rotational and axial movement of the actuator means, and finally snaps into a corresponding recess in the actuator means when the same arrives in the end position. Consequently, the actuator means is locked in the end position in which the control element is engaged and operated, so that the control element is held in the actuated position as long as the actuator means is arrested. Of course, when the arresting catch is withdrawn, the actuator means can be returned to the initial position.

As has been explained above, it is desirable that the actuator means are not operated as long as the rocket is only slowly accelerated. In accordance with the present invention, the start of the movement of the actuator means from the initial position to the end position is determined by a locking means which is responsive to a minimum acceleration, and consequently independent of electric circuits which are required by the prior art constructions.

The locking means locks the actuator means in the initial position against rotation, and includes a mass responsive to acceleration to cause release of the actuator means by the locking means. Means are provided for resisting the releasing movement of the mass so that the same takes place only at a certain acceleration.

In order to prevent that a momentary high acceleration causes release of the actuator means by the locking means so that the actuator means would then be moved to the end position by the following slow acceleration, damping means are provided for slowing down the releasing movement of the locking means, and delaying the release of the actuator means by the same. If a momentary high acceleration terminates before the actuator means is released by the locking means, a spring returns the locking means to the initial locking position. The damping means is preferably constructed as a pneumatic device including a movable piston displacing air through a throttle opening during the releasing movement of the locking means, and opening a valve in the correspinding cylinder when the piston is moved by the spring back to its initial position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
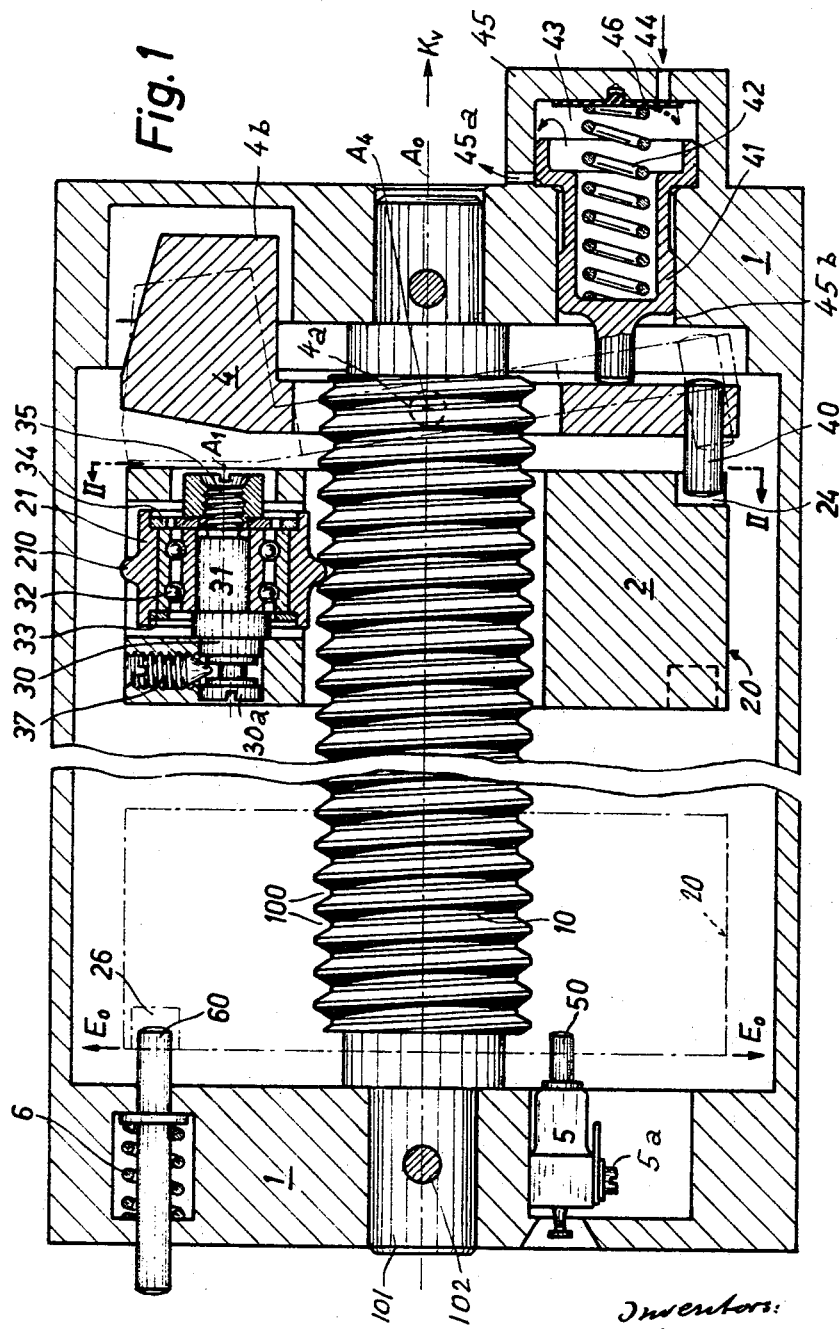
FIG. 1 is an axial sectional view illustrating an actuator arrangement according to one embodiment of the invention.

Referring now to the drawings, a supporting casing 1 has a longitudinal axis $A_0$ and is mounted in a rocket, not shown, in a position in which the axis $A_0$ extends in the direction of the longitudinal rocket axis, or parallel to the same.

Figure 2:
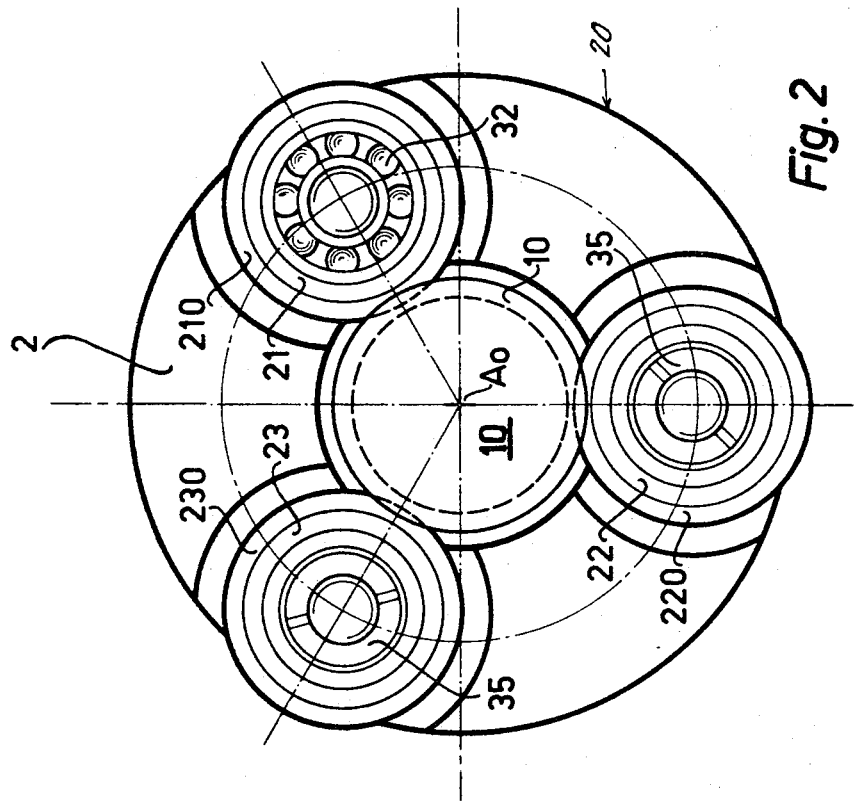
FIG. 2 is a fragmentary cross sectional view taken on line II—II in FIG. 1.
Figure 3:
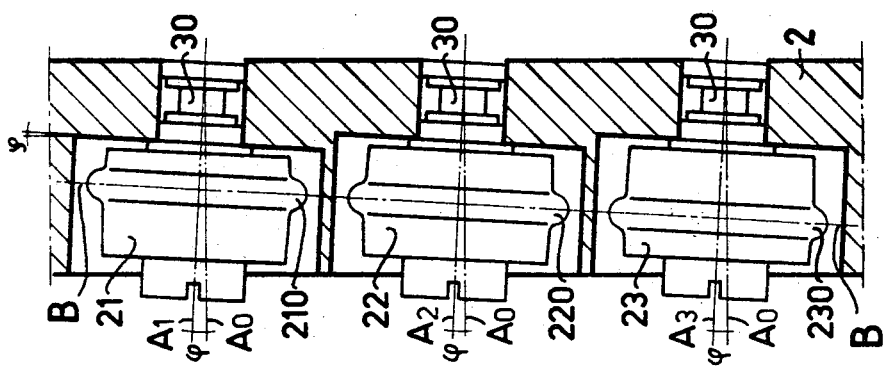
FIG. 3 is a fragmentary circumferential developed section of the actuator means of the embodiment of FIG. 1.

A spindle having a thread 100 and two shaft end portion 101, is secured by pins 102 to the top and bottom walls of casing 1 coaxial with axis $A_0$. An actuator means 20 includes a circular body 2 having rectangular cross section, and supporting three roller devices circumferentially spaced 120° and including rollers 21, 22, 23, respectively, as best seen in FIG. 2. The rollers have axes of rotaiton $A_1$, $A_2$, $A_3$, which are slanted to the axis $A_0$ and perpendicular to an imaginary helical surface defined by the helical thread 100 of spindle 10, and circular ridges 210, 220, 230 are located in this helical surface, as best seen in FIG. 3, and engage the grooves of thread 100. The cross sections of ridges 210, 220 and 230 corresponds to the cross section of thread 10 so that the flanks of the ridges are in line contact with the flanks of the adjacent helical thread ridges of thread 100, and roll on the same without sliding friction.

In order to achieve the desired self-centering of the annular body 2 on the spindle 10, the rollers 21, 22, 23 are adjusted so that an inner imaginary cylinder touching the innermost points of the circular ridges 210, 220, 230 is coaxial with the spindle axis $A_0$. Means are provided for adjusting the radial distances of the roller supporting shafts from the central axis of the respective roller device. As shown in FIG. 1, the annular body 2 has circumferentially spaced bores into which journals 30 are inserted. Axles 31 are secured to journals 30, respectively, in eccentric positions so that the axes $A_1$, $A_2$, $A_3$ are eccentric to the axes of journals 30, respectively. Journals 30 have slotted head portions 30a permitting turning of journals 30 and corresponding adjustment of the positions of the respective axles 31. Each axle 31 carries a ball bearing 32 with an inner ring secured to axle 31, and an outer ring secured to the respective rollers 21, 22, 23. Holding rings 33, 34 and a holding means 35 are provided for securing the ball bearing 32 and the rollers against movement in axial direction. A radially extending set screw 37 fixes journal 30 in a selected angular position in which the radial distance between the respective axis of a roller and the axis $A_0$ has the desired value, equal for all three rollers.

As shown in the developed view of circular body 2 shown in FIG. 3, the axes $A_1$, $A_2$, $A_3$, of rollers 21, 22, 23 are parallel to each other and slanted the same angle $\phi$ to the main axis $A_0$, the angle $\phi$ being the helix angle of the thread 100 of spindle 10. In the developed view of FIG. 3, the three roller ridges 210, 220, 230 are located along a straight line, indicating that they are located within an imaginary helical surface in which corresponding ridges and grooves of the thread 100 are located.

Due to the fact that the rollers engage the thread without any sliding friction, the actuating means 20 can move in axial direction of spindle 10 while rotating about axis $A_0$ without encountering any substantial friction. Even an extremely small turning movement is sufficient to obtain rotation of the actuating means about the spindle. Consequently, even a small force acting in axial direction of the spindle on the actuating means 20 will be sufficient to provide a circumferentially acting torque for rotating actuating means 20, even if the helix angle of the thread 100 is very small, for example 3.3°.

Actuating means 20 had an initial position shown in solid lines, and an end position shown in chain lines.

In the initial position, a recess 24 in annular body 2 is engaged by a locking pin 40 secured to a lever member 4 which is mounted on casing 1 by journal means 4a defining a pivot axis $A_4$ perpendicular to axis $A_0$. One end of lever member 4 is increased in size and weight by a mass 4b.

When the rocket on which casing 1 is mounted is accelerated in the direction of the axis $A_0$ and of the arrow $K_v$, inertia causes mass 4b to lag so that lever member 4 is turned in counterclockwise direction to the position indicated in chain lines whereby locking member 40 is withdrawn from recess 24 and releases the actuating means 20 for turning movement about spindle 10. In order to prevent that locking means 4, 40 is operated to release actuating means 20 at very slow acceleration of the rocket, a spring 42 acts on the lever 4 to hold the same in the locking position illustrated in solid lines.

Spring 42 abuts at one end a wall portion 45 of casing 1 which together with a bore 45b forms a pneumatic cylinder in which a pneumatic piston 41 is mounted. Piston 41 has an end portion abutting lever member 4 and is urged by spring 42 into engagement with the same so that spring 42 acts through piston 41 on lever member 4. An air chamber 43 is formed within cylinder wall 45 which has an inlet duct 44 and a narrow outlet duct 45a covered by piston 41 in the locking position of locking means 4, 40. A resilient valve flap normally covers inlet duct 44.

When the rocket is accelerated in the direction of the arrow $K_v$, and mass 4b urges the locking means to the releasing position shown in chain lines, piston 41 is pushed to the right as viewed in FIG. 1 and compresses the air in chamber 43 which slowly escapes by passing between a wall portion of piston 41 and wall 45 in a direction of the arrow to be discharged through outlet duct 45a. The inlet duct 44 is closed by valve flap 46 due to the increased pressure in chamber 43.

Consequently, piston 41 will very slowly move to the right as viewed in FIG. 1 against the action of spring 42 while air gradually escapes through outlet duct 45a.

Assuming that the rocket with casing 1 and locking lever 4 is momentarily accelerated so rapidly as to overcome the action of spring 41, the counterclockwise turning movement of lever member 4 will take place very slowly and it will take a given amount of time until locking pin 40 releases recess 24. If during this time the acceleration ceases or is substantially reduced, actuating means 20 will not be released for turning movement, and spring 42 will move piston 41 to the left as viewed in FIG. 1 whereby valve flap 46 is opened and air rapidly enters through inlet duct 44 so that piston 41 returns locking means 4, 40 to its initial position. Consequently, actuating means 20 is not released for turning movement during a short and rapid acceleration.

However, if acceleration sufficiently high to compress spring 42 acts for a longer time period on mass 4b, lever member 4 will turn in counterclockwise direction until piston 41 has been pushed back far enough to permit lever member 4 to assume the releasing position shown in chain lines in which locking member 40 is located outside of recess 24 in the circular body 2 of actuator means 20.

During such continued rapid acceleration, the inertia of the actuator means 20 and particularly of the circular body 2 which has a considerable mass, urges the released actuator means 20 to move in axially direction of spindle 10 toward the left as viewed in FIG. 1. The axial forces exerted by the circular ridges 210, 220, 230 on the thread 100 have components acting in circumferential direction so that actuator means 20 turns about spindle 10, particularly since the roller devices do not produce any sliding friction, but roll on thread 100.

After the rotary and axial movement of the actuator means 20 has been started, it is continued as long as the rocket is accelerated, and finally actuator means 20 arrives in the end position shown in chain lines.

Due to the construction of the roller devices, a very small pitch and helix angle of thread 100, for example, 3.3°, will permit rotation of the actuator means 20 already at an acceleration in axial direction of about 100 cm./sec.$^2$ $\approx 0.1$ g. The rolling friction opposing the rotational movement of actuator means 20 is mainly determined by the inner friction of ball bearing 31, assuming that the ridges 210, 220, 230 and the thread 100 are accurately ground and polished. The friction of the ball bearing is small and substantially proportional to the effective torque, and to the effective axial acceleration. Consequently, a main purpose of the present invention can be accomplished, namely approximate proportionality between the distance traveled by the actuator means due to the acceleration of the rocket, and the flight distance travelled in the same time by the rocket subjected to the same acceleration.

On the bottom wall of casing 1 trailing in flight direction, an arresting catch 60 is mounted, and urged by a spring 6 to assume the illustrated arresting position in which a flange thereon abuts a surface of casing 1. Circular body 2 has a recess 26 in the end face facing arresting catch 60 cooperating with the same.

A recess is provided in the same wall of casing 1 for mounting a control element in the form of a switch 5 having an actuator pin 50 projecting into the interior of casing 1. Control switch 5 has terminals 5a to which wires of an electric circuit can be clamped. As explained above, the electric circuit may cause ignition of an explosive charge, or any other operation desired after flight of the rocket for a predetermined distance.

Before actuator means 20 arrives in its end position shown in chain lines, the end face of circular body 2 already engages the ends of actuator pin 50 and catch pin 60. When actuator means 20 continues its movement toward the left, it turns so that pins 50 and 60 slide on the end face of body 2 while being depressed due to the axial movement of body 2. When the actuator means 20 arrives in its end position, recess 26 registers with catch pin 60 so that the same snaps into recess 26, locking actuator means 20 in a predetermined angular position which also is the end position of the actuator means. In this position, actuator pin 50 is depressed for actuating the switch, and is held in a depressed condition so that switch 5 is not opened again. Actuator means 20 may turn half a revolution between the moment of sliding engagement with catch pin 60, and the arresting of body 2 by the arresting catch 60 falling into recess 26.

During flight of the rocket at slow acceleration, the force of spring 42 prevents locking means 4, 40 to move to the releasing position, and actuator means 20 is locked in the illustrated initial position. If the rocket is momentarily accelerated at a high acceleration rate, locking means 4, 40 begins to turn slowly against the action of piston 41 which displaces air through the throttling means 45a. If the acceleration is reduced before locking pin 40 has moved out of recess 24, spring 42 returns through piston 41 the locking means to the initial locking position, the movement of piston 41 being facilitated by the opening of valve flap 46 which uncovers the inlet duct 46.

If a selected acceleration of at least 3 to 4 g. prevails for a sufficiently long time, the inertia of mass 4b causes turning movement of the locking means 4, 40 to the releasing position against the delaying and damping action of piston 41 during movement toward the right as viewed in FIG. 1. As soon as locking member 40 releases recess 24 in circular body 2, actuator means 20 starts to move out of the leading position shown in solid lines in FIG. 1, rotating about spindle 10 and moving in axial direction to the trailing end position shown in chain lines, the terms leading and trailing being used in relation to the direction of flight of the rocket and of casing 1. Shortly before arriving in the end position, actuator pin 50 is engaged together with arresting catch 60, and switch 5 is actuated to close the circuit causing the desired operation in the rocket. Finally, arresting catch 60 snaps into recess 26 and locks actuator means 20, so that body 2 holds switch 5 in actuated condition. However, if the operation of switch 5 did not cause the destruction of the device, it can be manually returned to its initial position after retraction of catch 60.

Due to the fact that the release of the actuator means 20 by the locking means 4, 40 is delayed by the damping means 41, 45, momentary rapid accelerations or vibrations of the apparatus will not cause actuation of control switch 5. On the other hand, spring 42 prevents the actuation of the apparatus by the smaller inertia forces developing when the rocket is only slowly accelerated.

It will be understood that each of the elements described above, or two or more together, may also find a useful application in other types of actuator arrangements for a flying object differing from the types described above.

While the invention has been illustrated and described as embodied in an actuator arrangement for effecting actuation of a control element in a rocket after flight for a predetermined distance and at a predetermined acceleration, it is not intended to be limited to the details shown, since various modifications and strutural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use with a rocket or like accelerated flying object having a longitudinal axis extending in flight direction, an actuator arrangement comprising, in combination, spindle means having a screw thread and an axis; mounting means supporting said spindle means on said rocket in a position in which the axis of said spindle means extends in the direction of said longitudinal axis of said rocket; actuator means including an annular means surrounding said spindle means, a plurality of rollers spaced in circumferential direction of said spindle means and being in rolling contact with said screw thread, and means for mounting said rollers on said annular means for rotation so that said actuator means is mounted for axial and rotary movement on said spindle means, said actuator means having an initial position located at one end of said spindle means leading in the flight direction and an end position located at other end of said spindle means trailing in said flight direction so that said actuator means moves during flight of said rocket due to inertia and during a time depending on a predetermined acceleration of said rocket from said initial position to said end position in axial direction of said spindle means while rotating about the same; and a control element for initiating an operation desired at a predetermined distance from the firing point of the rocket and being mounted on said rocket in the region of said trailing end of said spindle means so as to be engaged and actuated by said actuator means in said end positions whereby said operation is initiated by said actuated control element after flight of the rocket for a predetermined distance depending on the predetermined acceleration of the rocket.

2. An actuator arrangement as defined in claim 1, wherein said mounting means mount said rollers for rotation about axes slanted to the axis of said spindle means and perpendicular to the direction of said thread so that said rollers are located in an imaginary helical surface having the same helix angle as said thread.

3. An actuator arrangement as defined in claim 1, comprising an arresting catch; means on said rocket for guiding said catch for movement in axial direction of said spindle means; and means biasing said catch; and wherein said actuator means has an end face confronting said catch and formed with a recess for receiving said catch, said actuator means engaging said catch before arriving fully in said end position and displacing the same against the action of said biasing means so that said catch snaps into said recess arresting said actuating means and blocking further rotation of the same in said end position.

4. An actuator arrangement as defined in claim 1, comprising locking means including a mass and a locking member, and having a locking position in which said locking member engages said actuator means in said initial position for blocking rotation of the same and a releasing position releasing said actuator means for rotary and axial movement; means mounting said locking means on said rocket for movement in the longitudinal direction of said rocket; and means including a spring and resisting with a predetermined force movement of said locking means to said releasing position due to inertia of said mass during acceleration of said rocket so that only at a predetermined acceleration of said rocket said mass moves said locking means to said releasing position releasing said actuator means for movement out of said initial position.

5. An actuator arrangement as defined in claim 4 wherein said resisting means include damping means acting on said locking means for damping and delaying movement of the same to said releasing position so that rapid acceleration of the rocket during a short time period does not result in release of said actuator means by said locking means.

6. An actuator arrangement as defined in claim 5 wherein said damping means includes a damping cylinder member and a damping piston member in said cylinder member, one of said damping members being movable and operated by said mass, said damping cylinder having inlet and outlet ducts and valve means opened and closed by said movable damping member so that movement of said locking means to said releasing position is dampened for delaying the release of said actuator means during a momentary acceleration of the rocket; and wherein said spring acts on said movable damping member for returning the same to its initial position if the momentary acceleration ceases before release of said actuator means by said locking means.

7. An actuator arrangement as defined in claim 1 wherein said annular means includes a circular body surrounding said spindle means, said rollers being mounted on said body for rotation about axes slanted to the axis of said spindle means and perpendicular to the direction of said thread; and comprising locking means including a lever member having a mass and mounted on said rocket, and a locking member mounted on said lever member and having a locking position engaging said circular body in said initial position of said actuator means for blocking rotation of the same, and a releasing position releasing said body and said actuator means for rotary and axial movement; pivot means mounting said lever member for turning movement about an axis perpendicular to said longitudinal axis so that said mass is movable in the longitudinal direction of said rocket; and means resisting with a predetermined force the movement of said locking means to said releasing position so that only at a predetermined minimum acceleration of said rocket, said mass moves said lever member and said locking member to the releasing position.

8. An actuator arrangement as defined in claim 7 wherein said resisting means include a damping means having a movable damping member adapted to displace a fluid, and a spring acting on said damping member and urging the same into engagement with said lever member of said locking means so that said locking member is placed in said locking position, whereby said locking means has to overcome the resistance of said damping member and of said spring for releasing said actuator means.

9. An actuator arrangement as defined in claim 8 comprising an arresting catch; and means biasing said catch toward said circular body in said end position of said actuator means; and wherein said circular body has a circular end face confronting said catch and formed with a recess for receiving the same, said circular body engaging said catch before arriving in said end position and displacing the same against the action of said biasing means so that said catch snaps into said recess arresting said actuating means after turning movement of said actuator means through a selected angle; and wherein said control element is a control switch having an actuator pin engaged by said end face of said circular body substantially at the same time as said arresting catch, and being actuated during the final axial and rotary movement of said circular body to said end position of said actuator means.

References Cited

UNITED STATES PATENTS

| | | | |
|---|---|---|---|
| 647,546 | 4/1900 | Warren | 102—83 |
| 995,635 | 6/1911 | DuPont | 102—83 |
| 2,705,921 | 4/1955 | Moseman | 102—78 |
| 2,977,883 | 4/1961 | Czajkowski | 102—79 |
| 2,984,184 | 5/1961 | Cetre | 102—84 X |
| 3,066,605 | 12/1962 | Jones | 102—82 X |

SAMUEL FEINBERG, *Primary Examiner.*

BENJAMIN A. BORCHELT, *Examiner.*

G. H. GLANZMAN, *Assistant Examiner.*